(12) United States Patent
Aftanas et al.

(10) Patent No.: US 10,723,277 B2
(45) Date of Patent: Jul. 28, 2020

(54) VEHICLE ARTICLE CARRIER SYSTEM WITH END SUPPORT HAVING TUNABLE CLAMPING FORCE

(71) Applicant: JAC Products, Inc., Saline, MI (US)

(72) Inventors: Jeffrey M. Aftanas, Ortonville, MI (US); Michael J. Presley, Plymouth, MI (US); Gordon Michie, LaSalle (CA); Benjamin Kay, Troy, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 16/262,551

(22) Filed: Jan. 30, 2019

(65) Prior Publication Data
US 2019/0232881 A1    Aug. 1, 2019

Related U.S. Application Data

(60) Provisional application No. 62/624,349, filed on Jan. 31, 2018.

(51) Int. Cl.
*B60R 9/058* (2006.01)
*F16B 2/10* (2006.01)
*B60R 9/052* (2006.01)
*F16B 1/02* (2006.01)

(52) U.S. Cl.
CPC .............. *B60R 9/058* (2013.01); *B60R 9/052* (2013.01); *F16B 2/10* (2013.01); *F16B 1/02* (2013.01)

(58) Field of Classification Search
CPC ............ B60R 9/052; B60R 9/058; B60R 9/04
USPC ................ 224/309, 319, 321, 322, 325, 329
See application file for complete search history.

(56) References Cited

U.S. PATENT DOCUMENTS 4,877,169 A * 10/1989 Grim ...................... B60R 9/058
                                                              224/331
5,366,128 A    11/1994 Grim
5,556,221 A *  9/1996 Brunner ................. B60R 9/045
                                                              224/321
(Continued)

FOREIGN PATENT DOCUMENTS

EP            3243702 A1    11/2017

*Primary Examiner* — Justin M Larson
(74) *Attorney, Agent, or Firm* — Harness, Dickey & Pierce, P.L.C.

(57) ABSTRACT

The present disclosure relates to a vehicle article carrier system for supporting articles above an outer body surface of a vehicle. The system makes use of a pair of support rails fixedly secured generally parallel to one another on the outer body surface, and at least one cross bar assembly clampable to the support rails, and having a cross bar element having opposing ends. First and second end supports are secured at the opposing ends and able to engage the support rails to secure the cross bar against movement on the support rails. At least one of the end supports includes fixed and movable jaw portions, an actuating lever, and a pivot component pivotally coupled to the actuating lever and including a bore. A barrel nut is positioned in a bore of the movable jaw portion. A threaded member is coupled to both the barrel nut and the pivot component for changing an effective distance between the bore of the movable jaw portion and the pivot component, to thus effectively change a clamping force able to be applied by the movable jaw portion relative to the fixed jaw portion when the actuating lever is moved into a closed position.

20 Claims, 12 Drawing Sheets

(56) References Cited

U.S. PATENT DOCUMENTS

| | | | | |
|---|---|---|---|---|
| 5,730,343 | A * | 3/1998 | Settelmayer | B60R 9/045 224/321 |
| 5,845,828 | A * | 12/1998 | Settelmayer | B60R 9/045 224/321 |
| 6,796,471 | B2 * | 9/2004 | Aftanas | B60R 9/045 224/321 |
| 8,393,507 | B2 * | 3/2013 | Aftanas | B60R 9/058 224/309 |
| 8,839,997 | B2 * | 9/2014 | Lundgren | B60R 9/058 224/331 |
| 9,566,913 | B2 * | 2/2017 | Sarges | B60R 9/058 |
| 9,643,542 | B2 * | 5/2017 | Aftanas | B60R 9/058 |
| 9,688,211 | B2 * | 6/2017 | Schierk | B60R 9/058 |
| 9,834,152 | B2 * | 12/2017 | Almhill | B60R 9/058 |
| 10,160,393 | B2 * | 12/2018 | Ranka | B60R 9/052 |
| 2013/0193177 | A1 | 8/2013 | Poulsen et al. | |
| 2019/0232881 | A1 * | 8/2019 | Aftanas | B60R 9/052 |

* cited by examiner

VEHICLE ARTICLE CARRIER SYSTEM WITH END SUPPORT HAVING TUNABLE CLAMPING FORCE

CROSS REFERENCE TO RELATED APPLICATIONS

The present application claims priority from U.S. provisional application Ser. No. 62/624,349, filed Jan. 31, 2018, the entire contents of which are hereby incorporated by reference into the present disclosure.

FIELD

The present disclosure relates to vehicle article carrier systems and more particularly to a vehicle article carrier system having end supports which are used to support a cross bar from a support rail, and where a clamping force applied by the end supports can be adjusted.

BACKGROUND

The statements in this section merely provide background information related to the present disclosure and may not constitute prior art.

Vehicle article carrier systems have been in widespread use for a number of years, and are presently growing in popularity, due in part to the growing popularity of SUVs and mini-vans, and the general interest in increasing the cargo carrying capability of passenger motor vehicles.

A typical vehicle article carrier includes a pair of support rails which are fixedly secured to the roof surface of the vehicle. Typically at least one cross bar is included which has an end support at each end. The end supports typically clamp onto the one of the support rails to provide a surface above the outer body surface that may be used to support articles or other implements (e.g., bike racks, ski racks, cargo boxes, etc.) thereon.

Typically, an end support has traditionally made use of a locking pin which can be engaged with an opening in its associated support rail to positively lock the end support at a specific location along the length of the support rail. This has traditionally been needed because per U.S. federal crash test requirements, the end supports, and the cross bar which they support from the support rails, must not be able to slide along the support rails for any appreciable distance during an impact event. Traditionally, the idea of just relying on the clamping force provided by the end support to provide sufficient force to prevent movement of the cross bar during a crash event has been dismissed because of the inability of heretofore designed end supports to consistently provide the high degree of clamping force required to meet such crash tests. This is further complicated by slight variations in the dimensions of the support rails, slight variations in the thicknesses of rubber or elastomer layer surfaces which are often applied to the clamping surfaces of the end support components, and other variables, which can affect how much clamping force the end support exerts on its support rail. For example, if a support rail has a slightly smaller than expected cross sectional dimension, then the clamping force provided by the end support will be just slightly reduced. The same can be said if the rubber/elastomer pads used on the clamping surfaces of the end support have a thickness which is less than specified.

Another important consideration is that the end support clamping mechanism must be easy for an individual to latch and unlatch without requiring any external tools. Simply designing the end support with an added degree of clamping force beyond what is needed to effect secure clamping may make it unduly difficult for an individual to manipulate the end support between its latched and unlatched conditions. So ideally, the precise degree of force required to effect the clamping needs to be determined, and the additional force beyond that amount needs to be carefully controlled so that user latching and unlatching of the end support can be comfortably carried out. Meeting these opposing requirements has heretofore not been possible without incorporating some form of locking pin into the end support design.

SUMMARY

In one aspect the present disclosure relates to a vehicle article carrier system for supporting articles above an outer body surface of a vehicle. The system may comprise a pair of support rails fixedly secured generally, parallel to one another on the outer body surface. At least one cross bar assembly may be provided which is releasably clampable to the support rails. The cross bar assembly may include a cross bar element having opposing ends, with first and second end supports secured at the opposing ends. The end supports are able to engage with the support rails to secure the cross bar against movement on the support rails. At least one of the end supports may include a fixed jaw portion, a movable jaw portion having a bore, an actuating lever, and a pivot component pivotally coupled to the actuating lever and including a bore. A barrel nut is included which is positioned in the bore of the movable jaw portion. A threaded member is included which is coupled to both the barrel nut and the pivot component. The threaded member enables changing an effective distance between the bore of the movable jaw portion and the pivot component, to thus effectively change a clamping force able to be applied by the movable jaw portion relative to the fixed jaw portion when the actuating lever is moved from an open position to a closed position.

In another aspect the present disclosure relates a vehicle article carrier system for supporting articles above an outer body surface of a vehicle. The system may comprise a pair of support rails fixedly secured generally parallel to one another on the outer body surface, and at least one cross bar assembly releasably clampable to the support rails. The cross bar assembly may include a cross bar element having opposing ends, and first and second end supports secured at the opposing ends. The end supports are able to engage with the support rails to secure the cross bar against movement on the support rails. Each of the end supports may include an end support main housing, a fixed jaw portion integrally formed with the end support main housing, a movable jaw portion having a bore, and an actuating lever pivotally mounted to the end support main housing. A pivot component may be included which is pivotally coupled to the actuating lever and movable pivotally when the actuating lever is moved between open and closed positions. The pivot component may include a threaded bore. A barrel nut is included which has a threaded bore, and which is disposed in the bore of the movable jaw portion. A threaded member has a first threaded portion and a second threaded portion, wherein one of the first and second threaded portions forms a right handed thread and the other one of the first and second threaded portions forms a left hand handed thread. One of the first and second threaded portions is coupled to the threaded bore of the barrel nut and the other one of the first and second threaded portions coupled to the threaded bore of the pivot component for changing an effective distance between the bore of the movable jaw portion and the pivot component, to thus effectively change a clamping force able to be applied by the movable jaw portion relative to the fixed jaw portion when the actuating lever is moved from an open position to a closed position.

In still another aspect the present disclosure relates to a vehicle article carrier system for supporting articles above an outer body surface of a vehicle. The system may comprise a pair of support rails fixedly secured generally parallel to one another on the outer body surface, and at least one cross bar assembly releasably clampable to the support rails. The cross bar assembly may include a cross bar element having opposing ends, and first and second end supports secured at the opposing ends. The end supports are able to engage with the support rails to secure the cross bar against movement on the support rails. Each of the end supports may include an end support main housing, a fixed jaw portion integrally formed with the end support main housing, a movable jaw portion having a bore, and an actuating lever pivotally mounted to the end support main housing. A pivot component may be included which is pivotally coupled to the actuating lever and movable pivotally when the actuating lever is moved between open and closed positions. The pivot component may include a threaded bore. A barrel nut may be included which is positioned in the bore of the movable jaw portion, and which has a threaded bore. A threaded member may be included which has a first threaded portion and a second threaded portion. One of the first and second threaded portions forms a right handed thread and the other one of the first and second threaded portions forms a left handed thread. One of the first and second threaded portions is coupled to the threaded bore of the barrel nut and the other one of the first and second threaded portions is coupled to the threaded bore of the pivot component for changing an effective distance between the bore of the movable jaw portion and the pivot component. This enables a clamping force applied by the movable jaw portion relative to the fixed jaw portion to be adjusted, when the actuating lever is moved from an open position to a closed position. At least one ball plunger assembly may be included for holding the actuating lever in the open position once the actuating lever is rotated into the open position.

BRIEF DESCRIPTION OF THE DRAWINGS

The drawings described herein are for illustration purposes only and are not intended to limit the scope of the present disclosure in any way. Corresponding reference numerals indicate corresponding parts throughout the several views of the drawings. In the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
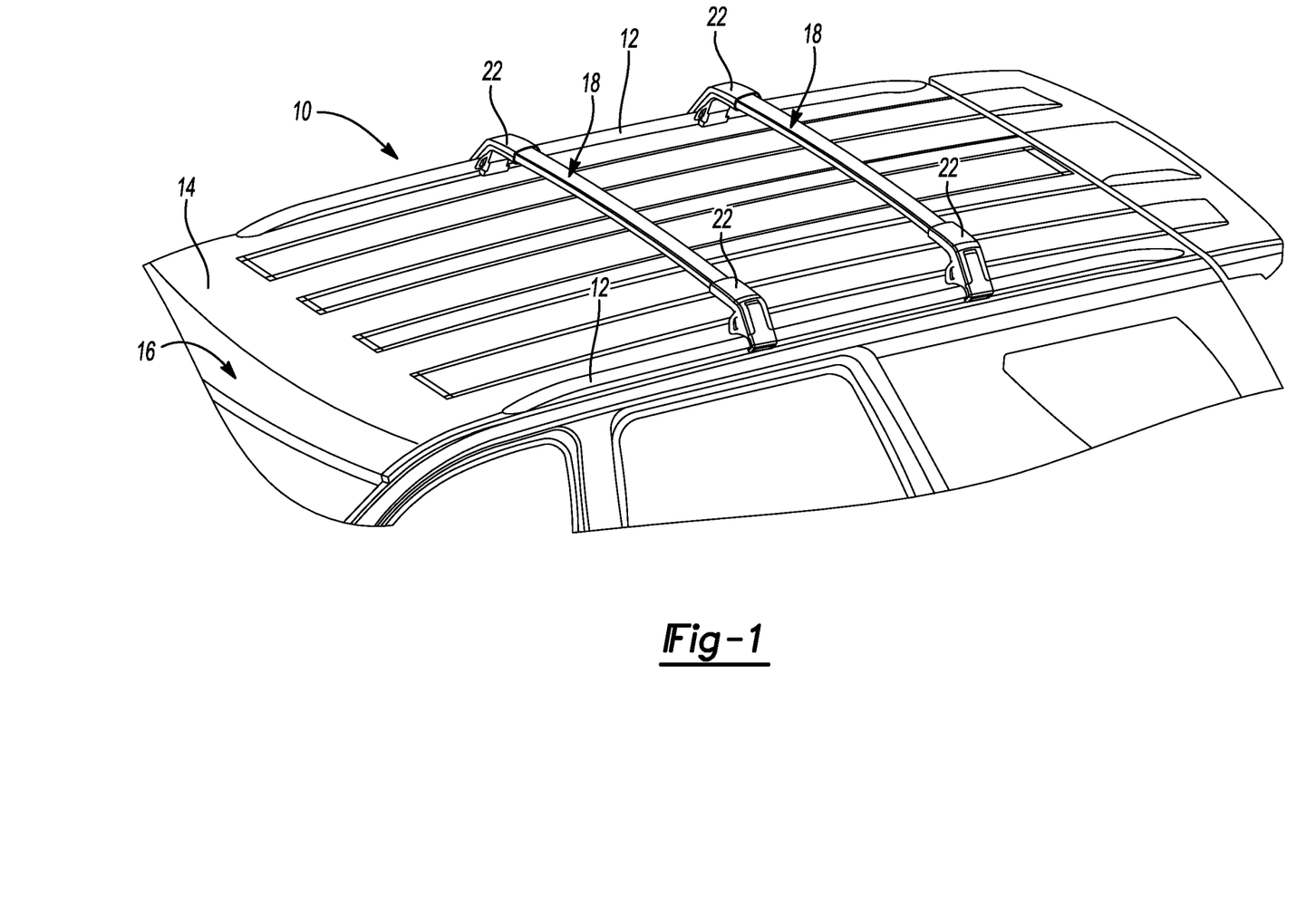
FIG. 1 is a perspective view of one embodiment of a vehicle article carrier system of the present disclosure secured to an outer body surface of a motor vehicle.

Referring to FIG. 1, there is shown a vehicle article carrier system 10 in accordance with one embodiment of the present disclosure. The system 10 in this example may include a pair of elongated support rails 12 that are fixedly secured to an outer body surface 14 of a motor vehicle 16 so that extend generally parallel to one another. The motor vehicle 16 in this example is an SUV, although it will be appreciated that the system 10 is not limited to use with only one type of motor vehicle. It is expected that the system 10 will be find use with other types of passenger vehicles including, but not limited to, sedans, station wagons, full size vans, minivans, and pickup trucks.

The system 10 may further include at least one cross bar assembly 18, and more preferably a pair of cross bar assemblies 18. In this example the cross bar assemblies 18 are also identical in construction, but they need not be perfectly identical. Each cross bar assembly 18 includes a cross bar element 20 having an end support 22 at its opposite ends. The end supports 22 each clamp on to an associated one of the support rails 12 to hold their respective cross bar assembly securely stationary at a desired longitudinal position on the support rails 12. And while the cross bar assemblies 18 have been illustrated as being identical in construction, it is possible that one of the cross bar assemblies may be non-adjustable, in which case the use of end supports 22 on that style of cross bar assembly would not be needed. For the purpose of the following discussion it will be assumed that the cross bar assemblies 18 are identical in construction.

FIGS. 2-5 illustrate one preferred construction for the end supports 22. Each end support 22 may include a main housing 24, a rear cover 26 held on to the main housing via a pair of threaded fasteners 28, an actuating lever 30, a fixed jaw portion 32 formed by a portion of the main housing 24, and an independent movable jaw portion 34. The fixed jaw portion 32 may include a rubber or elastomer pad 32a while the movable jaw portion 34 may include a similar rubber or elastomer pad 34a. Pads 32a and 34a help to increase the grip of the jaw portions 32/34 on the support rail 12.

The main housing 24 further includes a tubular neck portion 36 which receives a distal end of the cross bar element 20 and which is secured thereto via a plurality of threaded fasteners 38. The neck portion 36 may also include a slot 40 (FIG. 3) through which the threaded fasteners 38 extend to provide a degree of adjustment of the spacing separating the end supports 22 to accommodate a slight longitudinal tapering of the support rails 12, which necessitates slightly differing spacing for the end supports on the two cross bar assemblies 18 in this example.

Figure 2:
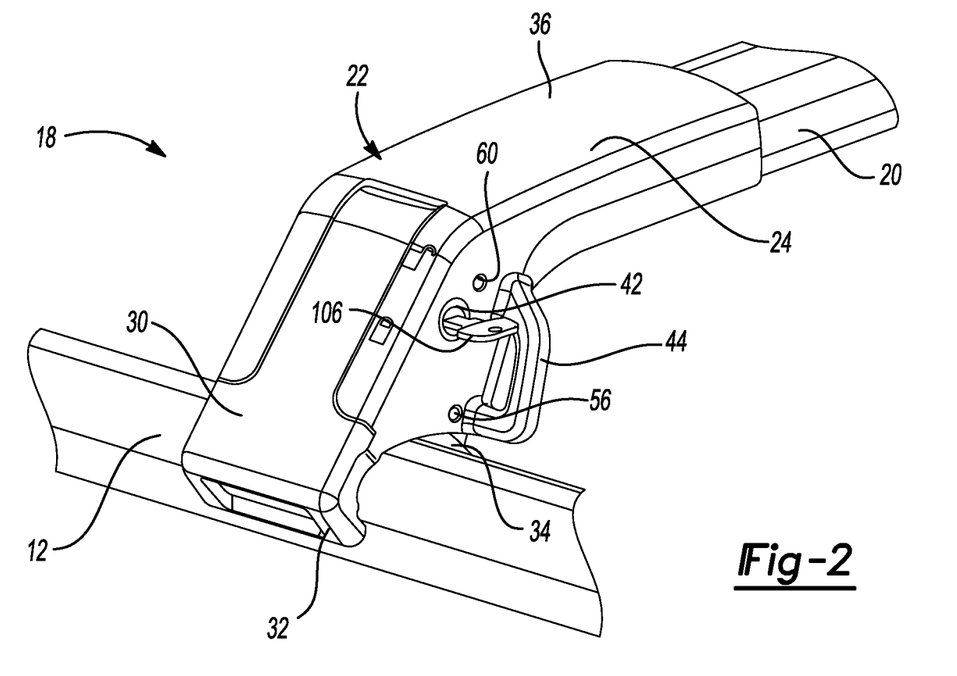
FIG. 2 is an enlarged, front perspective view of one end support of the system shown in FIG. 1 secured to its respective support rail.
Figure 3:
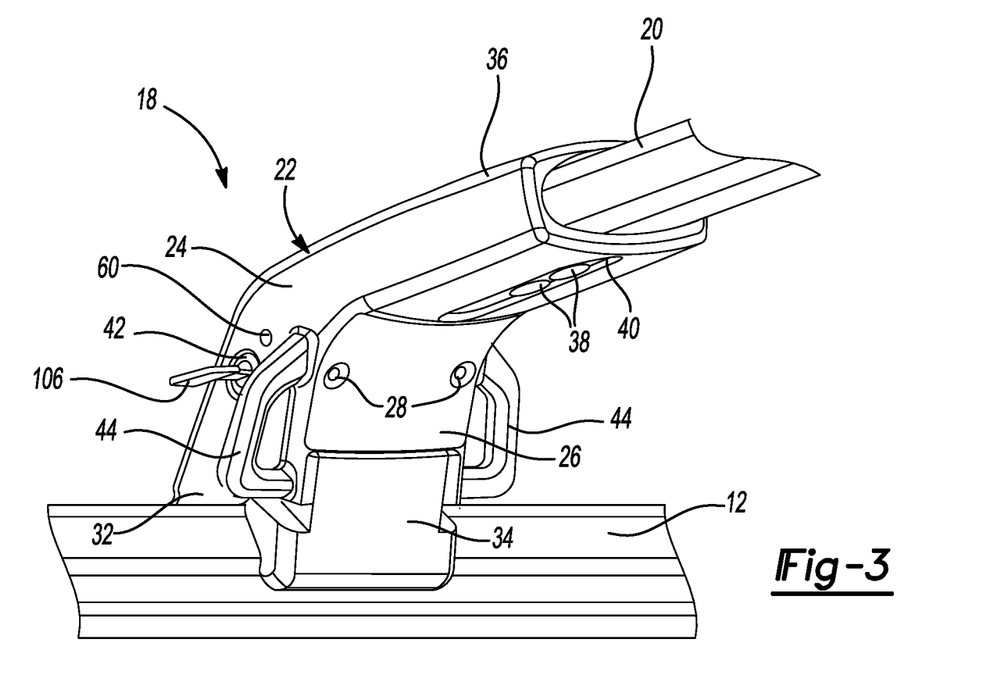
FIG. 3 is an enlarged, rear perspective view of the end support of FIG. 2.

The main housing 24 may also include an integrated locking assembly 42 for locking the actuating lever 30 in its clamped (i.e., locked) position as shown in FIGS. 2 and 3. The main housing 24 may also include at least one, and more preferably a pair, of integrated loops 44 for enabling external tie down components (e.g., bungee cords) to be attached thereto to help secure an external article to the cross bar assembly 18.

Figure 4:
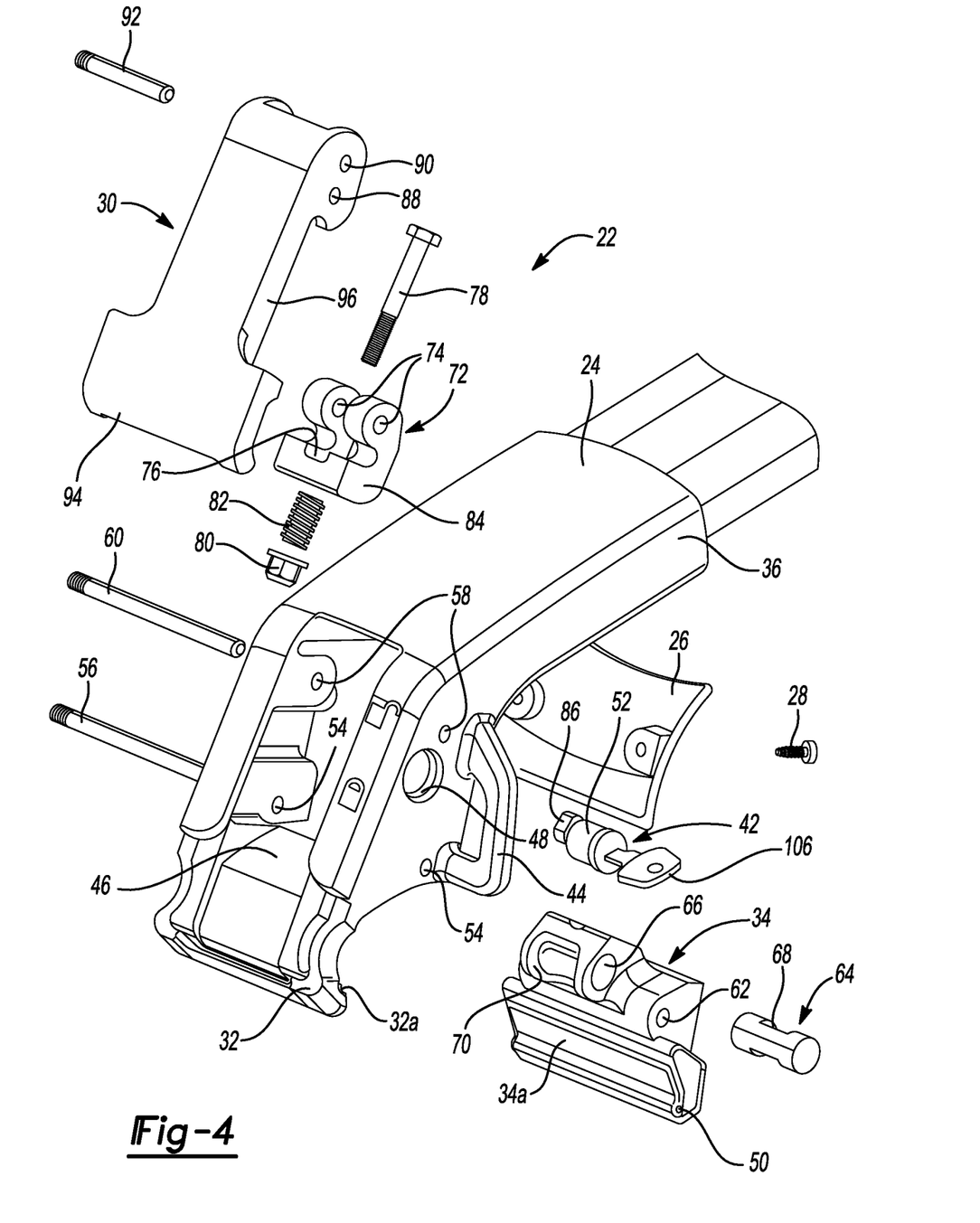
FIG. 4 is an exploded perspective view of the end support of FIG. 2.
Figures 5, 6:
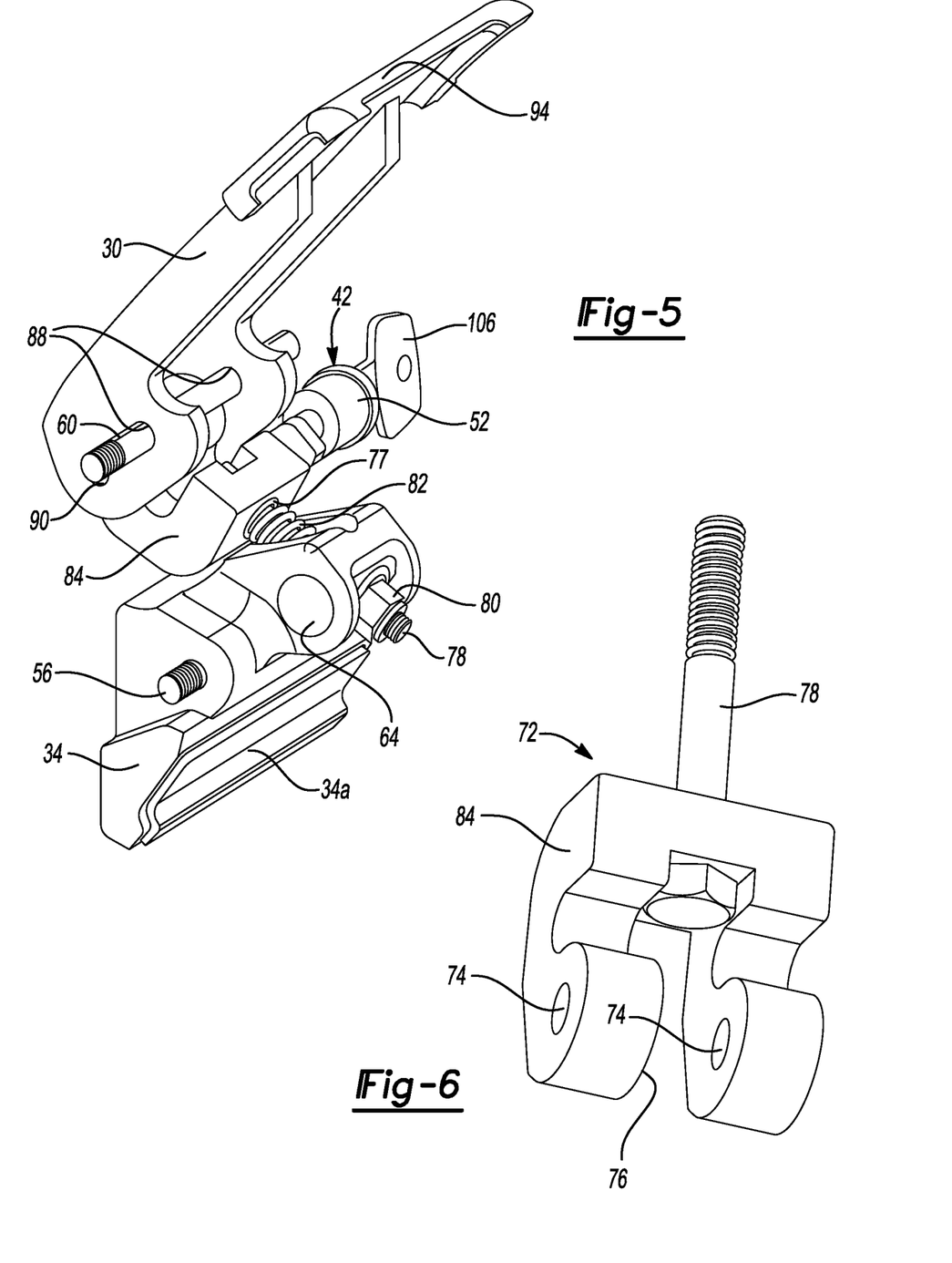
FIG. 5 is an assembled perspective view of a portion of the components of the end support of FIG. 4.
FIG. 6 is an enlarged, perspective view of just the pivot component of the end support.

Referring specifically to FIGS. 4 and 5, the various internal components of the end support 22 can be seen in greater detail. The end support 22 main housing 24 may include an internal wall portion 46 and a first enlarged opening 48. The internal wall portion 46 is shaped generally in accordance with a contour of a portion of the support rail 12, as well as the undersurface of the actuating lever 30, and forms a surface against which the actuating lever 30 may rest when in its locked position. The first enlarged opening 48 may receive a lock cylinder 52 of the locking assembly 42. Aligned openings 54 may receive a first pivot pin 56 and aligned bores 58 may receive a second pivot pin 60. The first pivot pin 56 may also extend through a bore 62 in the movable jaw portion 34 to support the movable jaw portion 34 for pivoting movement. A barrel nut 64 may be positioned within a bore 66 of the movable jaw portion 34. The barrel nut 64 includes a transverse bore 68 extending therethrough. The movable jaw portion 34 also includes a slot 70 which exposes the bore 68 of the barrel nut 64 over a range of pivoting movement of the movable jaw portion.

Referring further to FIGS. 4 and 6, the end support 22 includes a pivot component 72 having a pair of aligned bores 74 and a slot 76 through which a threaded adjustment bolt 78 may extend. A threaded nut 80, which is preferably a threaded nylon lock nut, and a spring 82 may be secured to the threaded adjustment bolt 78 as will be described further in the following paragraphs. The pivot component 72 includes a curving hook portion 84 which is dimensioned to receives a distal portion 86 of the lock cylinder 52 and to enable the actuating lever 30 to be secured in the clamped (i.e., locked) position, as will be described further in the following paragraphs.

Figure 7:
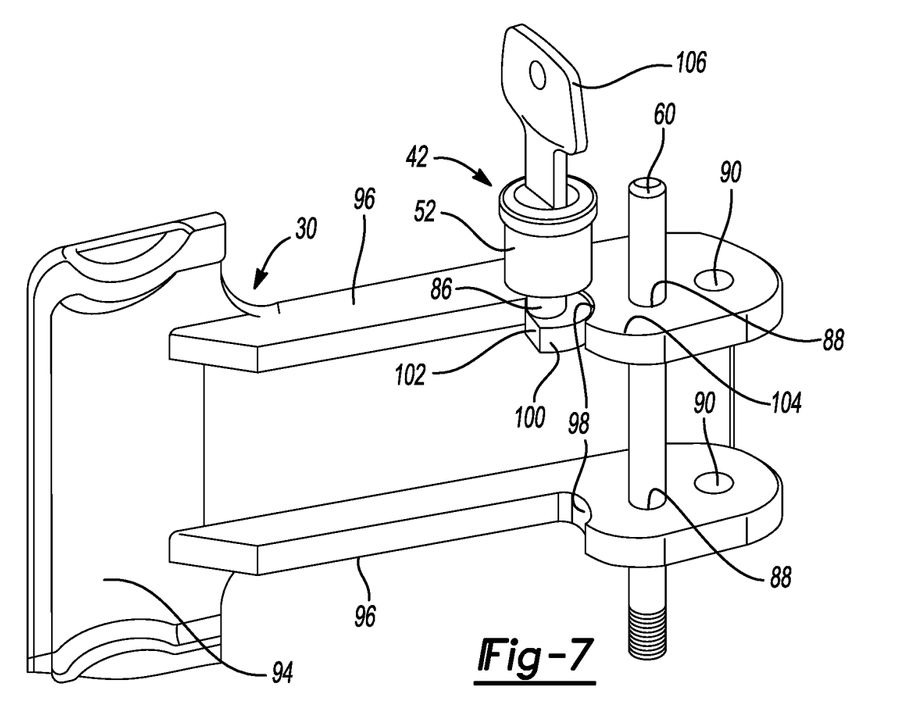
FIG. 7 is a perspective view of just the actuating lever and the locking assembly illustrating how the locking assembly locks the actuating lever against rotational movement when a lock cylinder of the locking assembly is in its locked position.

With further reference to FIGS. 4,5 and 7, the actuating lever 30 can be seen to include aligned bores 88 and aligned bores 90 extending therethrough. The bores 88 receive the second pivot pin 60 therethrough when the second pivot pin 60 is inserted through the aligned bores 58 in the main housing 24 and the actuating lever 30 is assembled into the main housing. This enables pivoting motion of the actuating lever 30 about pivot pin 60 between its locked and unlocked positions. The bores 90 of the actuating lever 30 and the bores 74 of the pivot component 72 receive a third pivot pin 92 when the pivot component 72 is assembled to the actuating lever 30. This enables the pivot component 72 to pivot freely about the third pivot pin 92 independently of pivoting motion of the actuating lever 30 as the actuating lever is pivoted between its locked and unlocked positions. The first pivot pin 56 couples the movable jaw portion 34 to the main housing 24 so that the movable lower jaw can pivot independently of the main housing 24, and independently of the pivot component 72, when the actuating lever 30 is moved between its locked and unlocked positions. The barrel nut 64 enables the movable jaw portion 34 to pivot independently without restriction from the threaded adjustment bolt 78.

With reference to FIG. 5, a portion of the end support 22 can be seen with the main housing 24 removed for clarity. The threaded adjustment bolt 78 extends through the slot 76 of the pivot component 72, through a hole 77, through the bore 68 in the barrel nut 64. The barrel nut 64 is shown positioned in the bore 66 of the movable jaw portion 34. This coupling enables rotational movement of the movable jaw portion 34 as the actuating lever 30 is lifted and lowered. It is a principal advantage of the end support 22 construction that the clamping force provided by the movable jaw portion 34, when the end support is positioned on its respective support rail 12, can be finely adjusted by tightening or loosening of the threaded nut 80. The spring 82 serves to help bias the movable jaw portion 34 to its open position when the actuating lever 30 is lifted into its fully open position. This enables the end support 22 to be tailored with a precise clamping force to accommodate slightly different cross sectional dimensions of the support rail 12, as well as slight differences in the thicknesses of the rubber/elastomer pads 32a and 34a of the fixed and movable jaw portions 32 and 34, respectively. This adjustment is expected to be a factory set parameter which the end user will not need to adjust after the factory adjustment is performed. Optionally, a cover may be placed over the either the head of the threaded adjustment bolt and/or the nut 80 to eliminate the possibility of an end user tampering with the factory set load adjustment.

It will be appreciated that the ability to adjust the clamping force of the end support 22 enables other modifications to be easily made to the end support. For example, simply by changing the shape of the fixed jaw portion 32 of the main housing 24 and/or the shape of the undersurface 50 of the movable jaw portion 34, the end support 22 can potentially be retrofitted for use with support rails having a markedly different cross sectional shape or configuration without redesigning or modifying the internal mechanism of the end support 22. Potentially, the end support 22, and particularly the pivot component 72, the spring 82, the threaded adjustment bolt 78 and the nut 80, can be selected to provide a predetermined range of travel to suit support rails having significantly different cross sectional dimensions.

Figure 8:
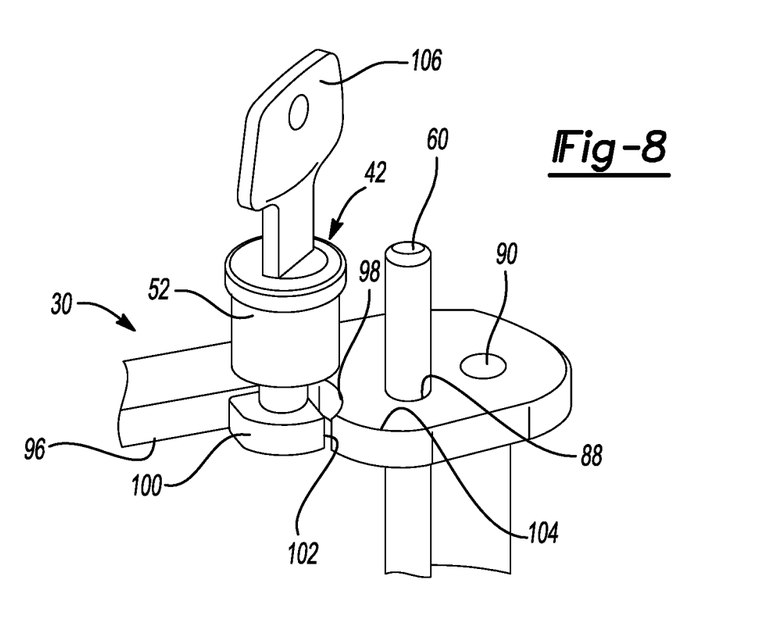
FIG. 8 is a perspective view of just a portion of the actuating lever and the locking assembly of FIG. 7, showing the lock cylinder positioned to allow rotational movement of the actuating lever.

With brief reference to FIG. 7, the actuating lever 30 can be seen to be formed with a manually graspable end portion 94, and a pair of sidewall portions 96 each having a circular recessed portion 98. The distal portion 86 of the lock cylinder 52 includes a rounded portion 100 and a flat portion 102. When the rounded portion is positioned as shown in FIG. 7, rotation of the actuating lever 30 about the second pivot pin 60 is not possible as the rounded portion 100 blocks movement of inner jaw portion 104 of the sidewall portion. 96. FIG. 8 shows that rotation of the distal portion 86 moves the rounded portion 100 out from the circular recessed portion 98 so that the flat portion 102 faces the circular recessed portion, which allows the needed clearance to permit rotation of the actuating lever 30 towards its unlocked position. A conventional key 106 may be used to lock the lock cylinder 52 and prevent the actuating lever 30 from being rotated into its unlocked position.

Figure 9:
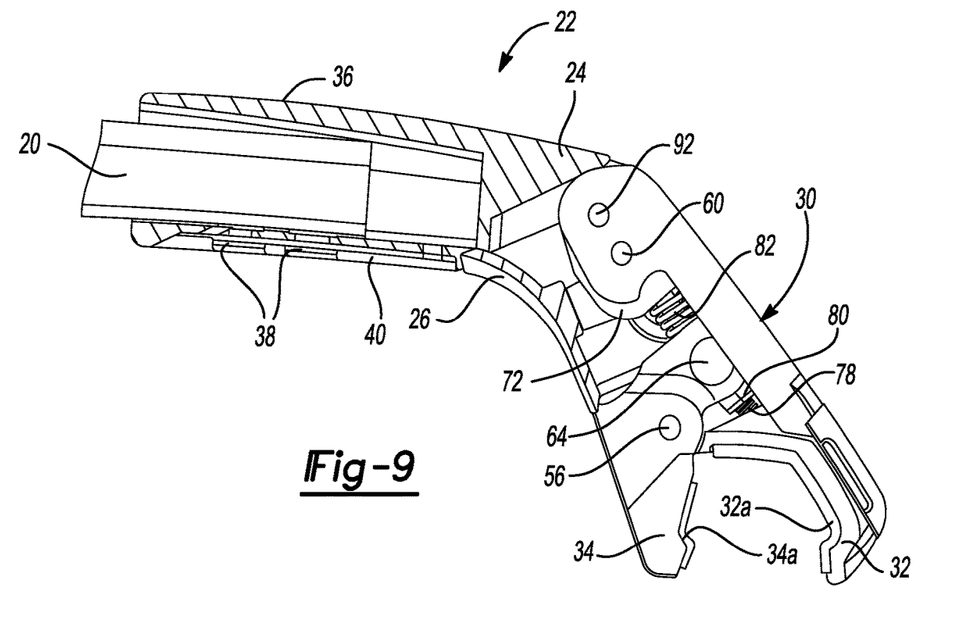
FIG. 9 is a side sectional view of the end support of FIG. 2 illustrating the arrangement of its internal components when the actuating lever thereof is in the locked position.
Figure 10:
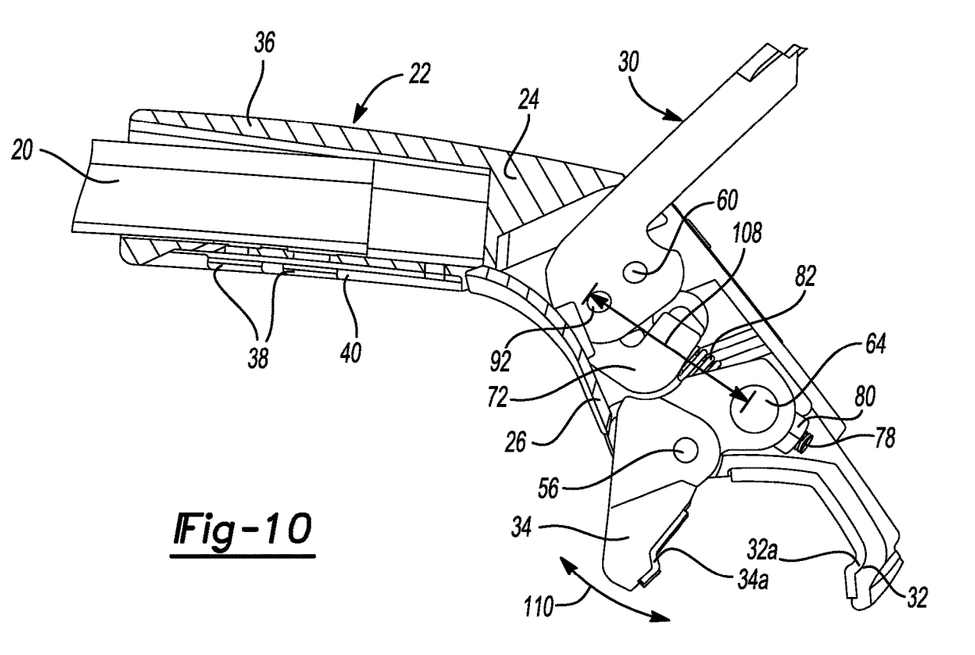
FIG. 10 shows the end support of FIG. 9 but with the orientations of the various internal components when the actuating lever is in its unlocked position.

With reference to FIGS. 9 and 10, the end support 22 can be seen in its fully locked position (FIG. 9) and in its unlocked position (FIG. 10). The positioning of the threaded nut 80 on the threaded adjustment bolt 78 effectively allows the distance between the barrel nut 64 and the pivot pin 60, indicated by arrow 108 in FIG. 10, to be changed. This causes an adjustment in the travel of the movable jaw portion 34 as indicated by arc line 110. Tightening (i.e., advancing) the nut 80 on the threaded adjustment bolt 78 moves the movable jaw portion 34 closer to the fixed jaw portion 32, which results in an increased amount of force being required to move the actuating lever 30 past an over center position into the fully locked position or out from the fully locked position. Loosening the threaded nut 80 moves the movable jaw portion 34 further away from the fixed jaw portion 32, and thus decreases the amount of force required to move the actuating lever 30 into its locked position or out from its locked position. The end support 22 can be tailored to provide a wide degree of clamping force to meet the needs of present day US Government crash test requirements which dictate how much movement of the end supports 22 is acceptable in a full frontal collision. The end support 22 of the present disclosure can be easily tuned to provide between 150 psi-200 psi or more of clamping force, which is expected to easily meet the above mentioned crash test requirements. In the embodiments of the end support 22 illustrated in the Figures, roughly 95 degrees of actuating lever 30 movement provides about 25 degrees of movement of the movable jaw portion 34, and this amount of actuating lever 30 travel can be further changed/tuned with minor dimensional changes to the various components of the end support 22. Thus, the end support 22 enables the actuating lever 30 to be easily manipulated between its locked and unlocked positions while using only one hand of an individual, while still generating a high degree of clamping force on its support rail 12 when placed in its locked position.

Figure 11:
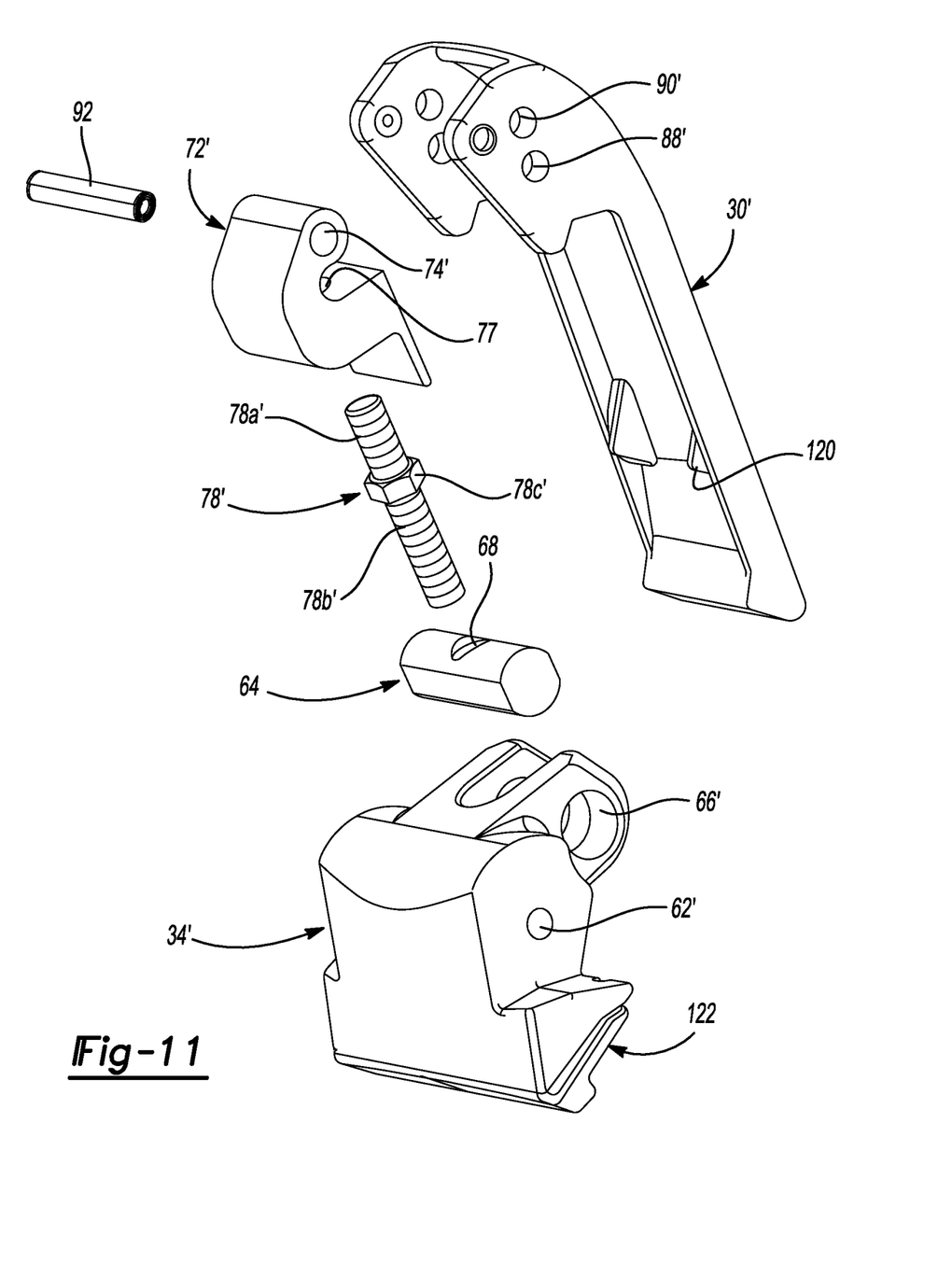
FIG. 11 shows perspective illustrations of another embodiment of the pivot component, the movable jaw and the adjustment bolt, which enables adjustment of the clamping force provided by the end support onto a support rail while the end support is assembled onto the support rail.
Figure 12:
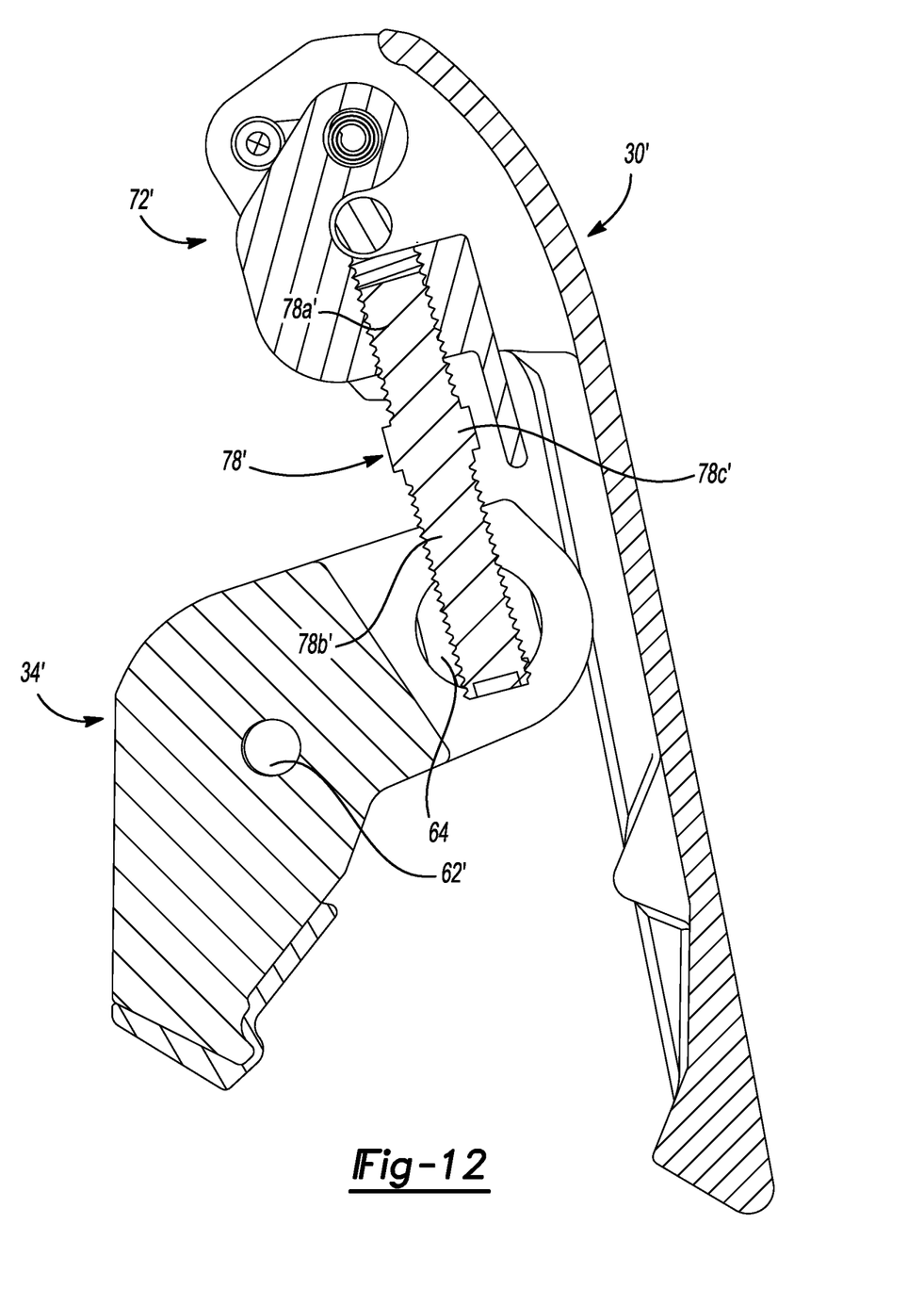
FIG. 12 is a side cross sectional view of just the actuating lever assembled to the pivot component with the adjustment bolt.

Referring to FIGS. 11 and 12, a pivot component 72', a threaded stud 78', a movable jaw portion 34' and an actuating lever 30' are shown in accordance with another embodiment of the end support 22. These components enable adjusting the clamping force that the end support 22 applies while the end support 22 is substantially fully assembled and positioned on the support rail 12, as well as making minor adjustments to the clamping force at a later time after the end support has been in use for some time period, and without requiring significant disassembly of the end support 22.

In FIG. 11 the pivot component 72' includes a first bore 74' and a perpendicularly arranged second bore 77' which in this embodiment is threaded. The threaded stud 78' includes a first threaded portion 78a', a second threaded portion 78b' and a central hex portion 78c'. The central hex portion 78c' may be engaged with a conventional open ended wrench and turned in clockwise or counterclockwise directions. The first threaded portion 78a' may form a left handed thread, while the second threaded portion 78b' may form a right handed thread. The second threaded portion 78b' engages with the threaded bore 68, while the first threaded portion 78a' engages with the threaded bore 77' in the pivot component 72'.

The threaded stud 78' is shown assembled to the pivot component 72' in FIG. 12. The opposing threads of the first and second threaded portions 78a' and 78b' enable the distance 108 (FIG. 10) to be increased or decreased depending on which way (clockwise or counterclockwise) the threaded stud 78' is turned. Importantly, the central hex portion 78c resides above the movable jaw portion 34', and because of this positioning it is accessible when the rear cover 26 (is removed). This makes it easily accessible for adjustment, whether such adjustment is being done during initial assembly in a factory environment or even at some later date after the system 10 has been in use for a period of time (e.g., weeks, months or even years). The disassembly required for the end support 22 to access the central hex portion 78c requires only the removal of the rear cover 26 (FIG. 4) and the use of a conventional hand tool (e.g., open end wrench).

With further reference to FIGS. 11 and 12, the assembly of the pivot component 72' to the actuating lever 30' and to the movable jaw portion 34' and to the actuating lever 30' is the same as that described above for the movable jaw portion 34 and the actuating lever 30. The barrel nut 64 is inserted into the bore 66' of the movable jaw portion 34', while the pivot pin 56 (FIG. 4) is received in a bore 62'. The pivot pin 92 extends through aligned bores 90' of the actuating lever 30', and the pivot pin 60 (shown in FIG. 5) would extend through the aligned bores 90'.

Figure 13:
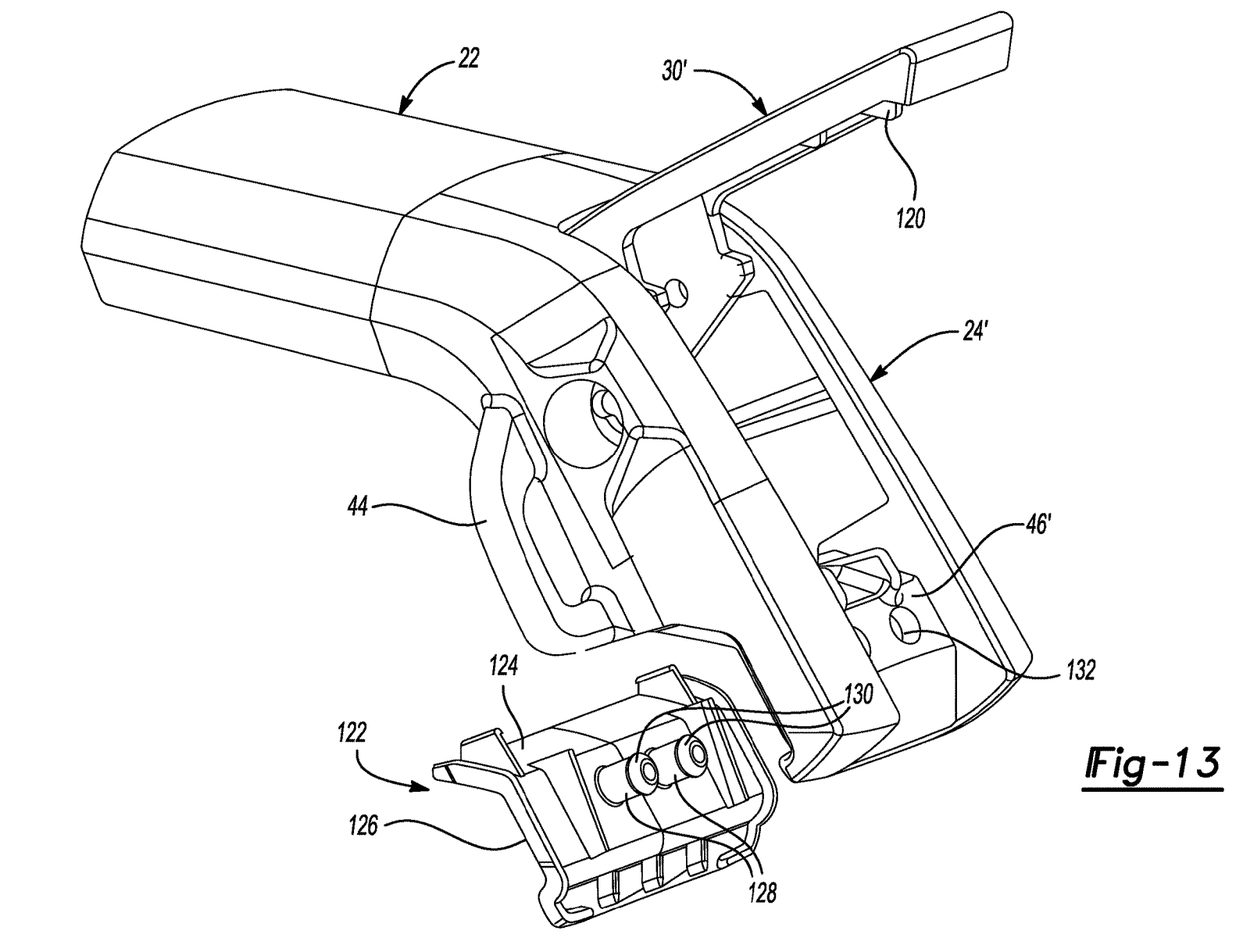
FIG. 13, is a perspective view of another embodiment of the end support which includes compressible head portions that serve to both retain an elastomeric pad and to provide a cushioned stop for the actuating lever when the actuating lever is moved to a fully closed position.
Figure 14:
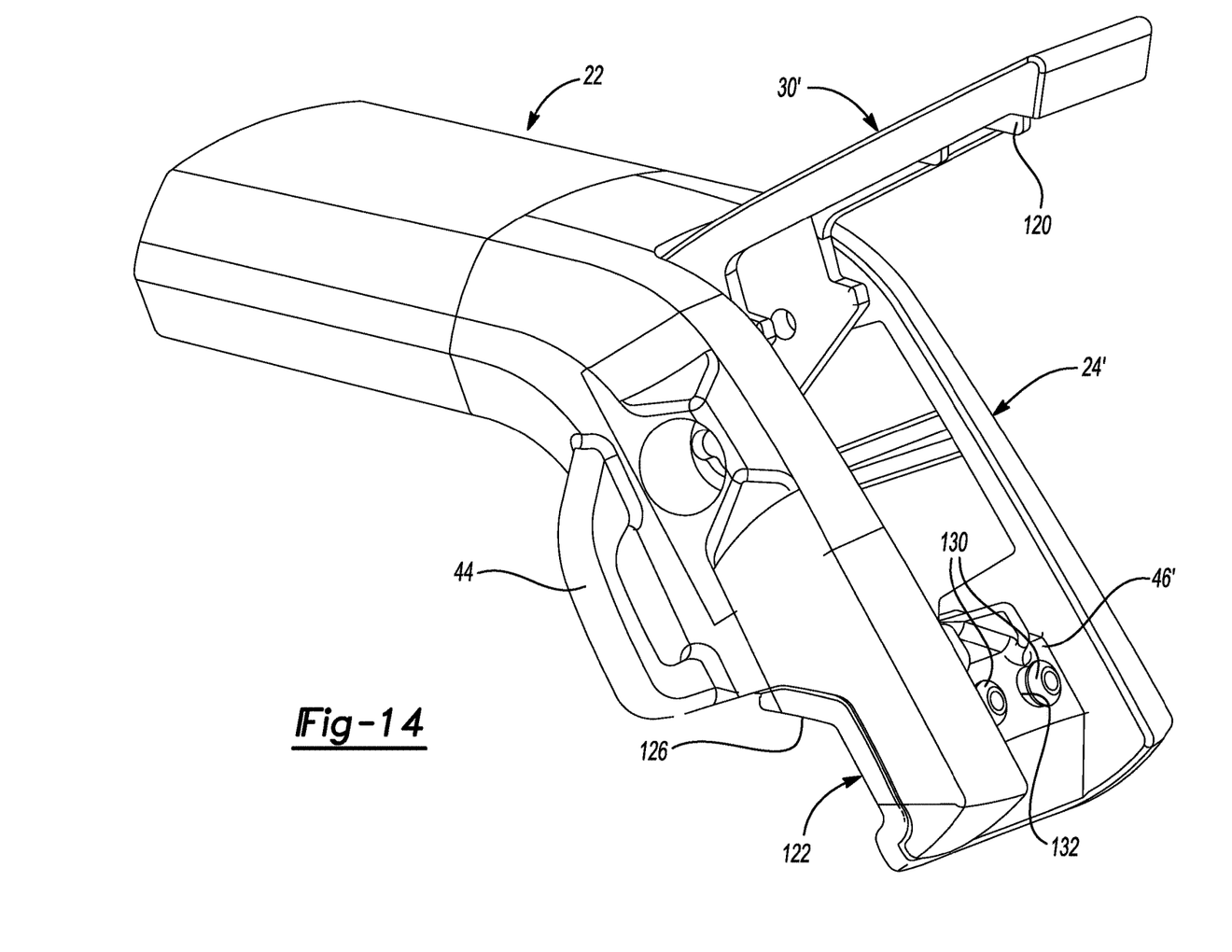
FIG. 14 shows the elastomeric pad of FIG. 13 fully installed on the fixed jaw portion of the end support, with the compressible head portions visible and projecting outwardly from an inner wall portion of the fixed jaw portion of the end support.

Referring to FIGS. 11, 13 and 14, the actuating lever 30' can be seen to also include a pair of integrally formed projections 120, while the fixed jaw portion 32 includes an independent pad assembly 122. The pad assembly 122, as shown in FIG. 13, can be seen to include a frame portion 124 with a resilient or elastomeric surface portion 126 secured thereto, such as by adhesives. The elastomeric surface portion 126 has a pair of boss portions 128 that project outwardly, and each has a compressible retaining head portion 130 that projects outwardly therefrom. The head portions 130 are spaced apart to align with a pair of openings 132 in an internal wall portion 46' of an end support main portion 24'.

As shown in FIG. 14, the frame portion 124 is assembled to the end support main portion 24' by simply pushing the compressible head portions 130 through the openings 132, which securely affixes the pad assembly 122 to the end support main portion 24'. The compressible head portions 130 serve the additional purpose of providing cushioned, positive stops because they engage with the projections 120 on the actuating lever 30' as the actuating lever is moved into the fully closed position.

Figure 15:
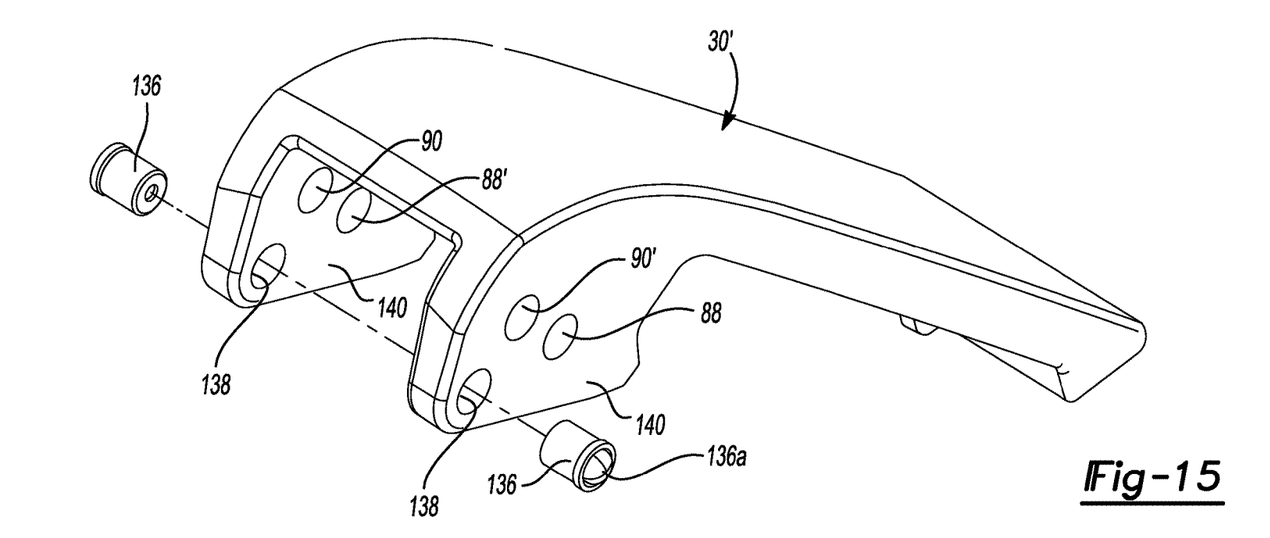
FIG. 15 illustrates a perspective view of another embodiment of the actuating lever which incorporates ball plungers that help to hold the actuating lever in a fully open position, but which still allow the actuating lever to be moved with only a small additional amount of force past an intermediate open position to a fully closed position.
Figure 16:
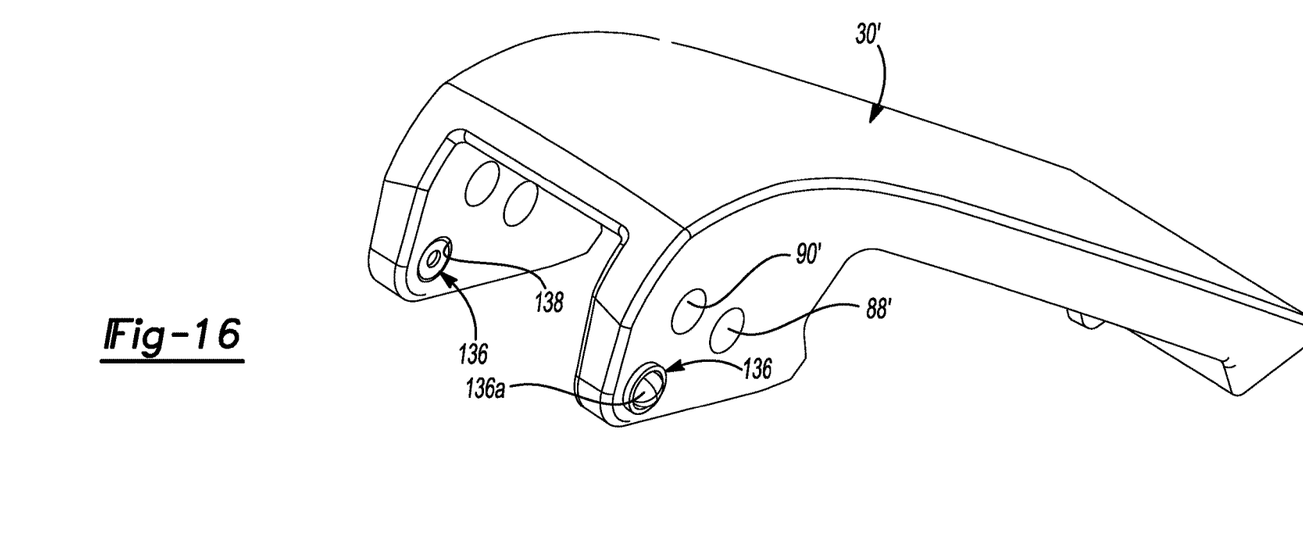
FIG. 16 shows the ball plungers of FIG. 15 fully inserted in the actuating lever.

With reference to FIGS. 11, 15 and 16, the actuating lever 30' in this embodiment may also include a pair of commercially available ball plungers 136. The ball plungers 136 are conventional assemblies that are widely commercially available, and which make use of spring loaded, captive but movable ball portions 136a. The ball plungers 136 are seated in bores 138 formed in the flange portions 140 of the actuating lever 30' such that the movable ball portions 136*a* project outwardly from the flange portions 140, as shown in FIG. 16.

Figure 17:
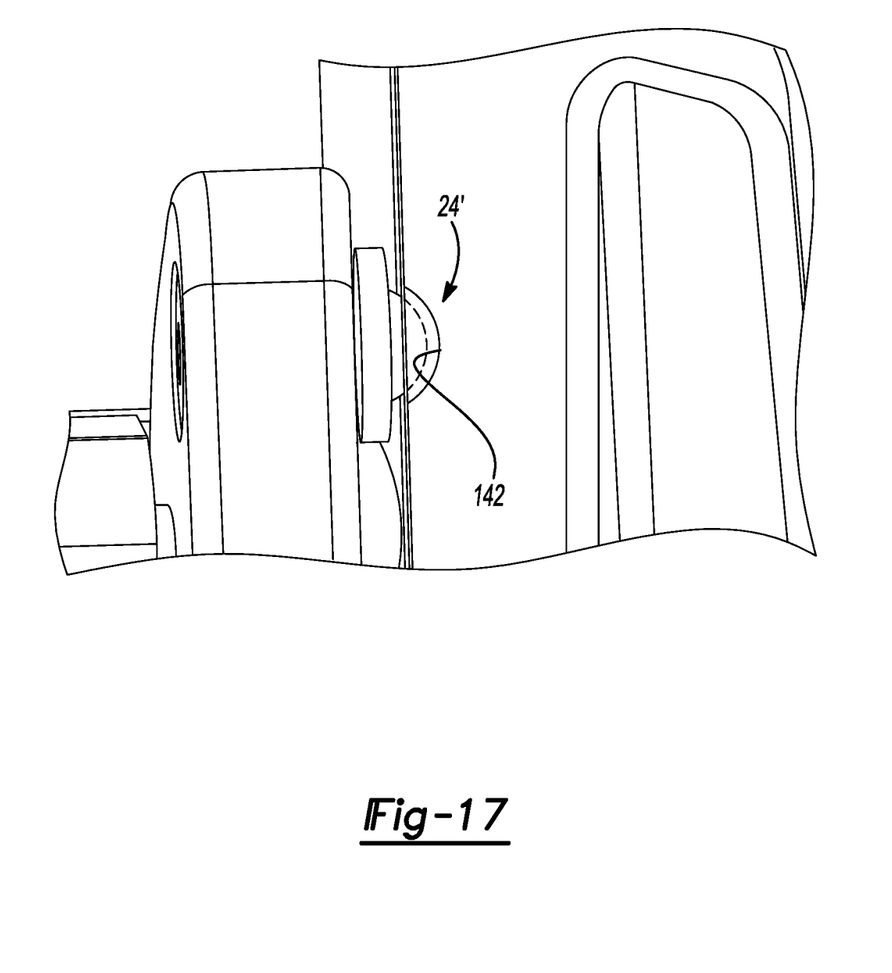
FIG. 17 shows the ball plungers engaging within the end frame portion of the end support when the actuating lever is in a fully closed position.

With reference to FIG. 17, one movable ball portion 136*a* of one of the ball plungers 136 can be seen engaged with a small spherical recess 142 formed on an opposing surface of the frame portion 24' of the end support 22. The placement of the small spherical recess 142 is selected and shaped such that when the actuating lever 30' is moved to its fully opened position, the movable ball portion 36*a* will partially engage within the small spherical recess 142, thus holding the actuating lever 30' stationary in the fully opened, or near fully opened positioned. Alternatively, instead of the small spherical recess 142, a small shoulder or projection may be formed at a suitable location on the frame portion 24' of the end support 22 so that when the movable ball portion 136*a* moves over the projection or shoulder as the actuating lever 30' is being opened, the movable ball portion 136*a* will be held in the fully opened (or nearly fully opened position). Only a small additional force is required to rotate the actuating lever 30' so that the movable ball portion 136*a* is moved out of the small spherical recess 142 (against the biasing force provided by the internal spring of the ball plunger 136), or optionally past a small shoulder portion or other form of projection, when the actuating lever is moved into the closed position. This enables the actuating lever 30' to be maintained in the open position when the user is positioning it over the support rail 12.

An important advantage of the end supports 22 is that they can provide a sufficiently high clamping force when secured to the support rails 12 so that the end supports can secure their respective cross bar assembly 18 to the support rails 12 to meet present day vehicle crash test requirements without the need for a separate locking pin to be used with each end support. Eliminating the need for a locking pin to be incorporated into each end support 22 also eliminates the need to machine one or more holes along the length of each support rail 12, and thus helps to reduce the overall manufacturing costs of the support rails and simply their construction, in addition to maintaining maximum strength of the support rails.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for supporting articles above an outer body surface of a vehicle, the system comprising:
   a pair of support rails capable of being fixedly secured generally parallel to one another on the outer body surface;
   at least one cross, bar assembly releasably clampable to the support rails, the cross bar assembly including:
      a cross bar element having opposing ends;
      first and second end supports secured at the opposing ends, the end supports being able to engage with the support rails to secure the cross bar against movement on the support rails;
   at least one of the end supports including:
      a fixed jaw portion;
      a movable jaw portion having a bore;
      an actuating lever;
      a pivot component pivotally coupled to the actuating lever and including a bore;
      a barrel nut positioned in the bore of the movable jaw portion; and
      a threaded member coupled to both the barrel nut and the pivot component for changing an effective distance between the bore of the movable jaw portion and the pivot component, to thus effectively change a clamping force able to be applied by the movable jaw portion relative to the fixed jaw portion when the actuating lever is moved from an open position to a closed position.

2. The system of claim 1, wherein the pivot component includes:
   a non-threaded bore; and
   wherein the at least one of the end supports includes a pivot pin positioned in the non-threaded bore for pivotally securing the pivot component to the actuating lever.

3. The system of claim 1, wherein the pivot component includes a threaded bore, and wherein the barrel nut includes a threaded bore.

4. The system of claim 3, wherein:
   the threaded member includes a threaded stud, the threaded stud having:
      a central portion configured to be engaged with an external wrench to enable rotation of the threaded member using the external wrench;
      a first threaded portion on a first side of the central portion, which threadably engages with the threaded bore in the pivot component;
      a second threaded portion on a second side of the central portion which threadably engages with the threaded bore of the pivot component; and
      wherein rotation of the threaded member in a first rotational direction shortens the distance between the bore of the movable jaw portion and the pivot component, and movement of the threaded member in a second rotational direction opposite to the first rotational direction increases the distance between the bore of the movable jaw portion and the pivot component.

5. The system of claim 1, wherein the at least one end support further includes a main housing.

6. The system of claim 5, wherein the main housing includes a removably secured rear cover; and
   wherein the threaded member is accessible for adjustment when the rear cover is removed.

7. The system of claim 1, further including a locking mechanism integrated into the at least one end support for locking the end support in the closed position.

8. The system of claim 1, further including at least one ball plunger assembly integrated into the at least one end support for maintaining the actuating lever in the open position once the actuating lever is rotated into the open position.

9. The system of claim 8, wherein the ball plunger assembly is mounted in a bore in the actuating lever.

10. The system of claim 5, further comprising a fixed pad assembly secured to the fixed jaw portion, the fixed pad assembly including:
    an elastomeric portion having a projecting boss portion, the projecting boss portion having an enlarged, compressible head portion; and the compressible head portion configured to engage with a hole in the end support main housing to secure the fixed pad assembly to the fixed jaw portion of the at least one end support.

11. The system of claim 10, wherein the compressible head portion forms a stop for the actuating lever when the actuating lever is moved into the closed position.

12. The system of claim 10, wherein the elastomeric portion has a pair of the projecting boss portions, with each one of the projecting boss portions including a compressible head portion; and
wherein the end support main housing includes a pair of holes for receiving the compressible head portions; and
wherein the compressible head portions form stops for the actuating lever when the actuating lever is moved into.

13. A vehicle article carrier system for supporting articles above an outer body surface of a vehicle, the system comprising:
a pair of support rails capable of being fixedly secured generally parallel to one another on the outer body surface;
at least one cross bar assembly releasably clampable to the support rails, the cross bar assembly including:
a cross bar element having opposing ends;
first and second end supports secured at the opposing ends, the end supports being able to engage with the support rails to secure the cross bar against movement on the support rails;
each of the end supports including:
an end support main housing;
a fixed jaw portion integrally formed with the end support main housing;
a movable jaw portion having a bore;
an actuating lever pivotally mounted to the end support main housing;
a pivot component pivotally coupled to the actuating lever and movable pivotally when the actuating lever is moved between open and closed positions, the pivot component including a threaded bore;
a barrel nut positioned in the bore of the movable jaw portion, the barrel nut including a threaded bore;
a threaded member having a first threaded portion and a second threaded portion, wherein one of the first and second threaded portions forms a right handed thread and the other one of the first and second threaded portions forms a left hand handed thread; and
one of the first and second threaded portions coupled to the threaded bore of the barrel nut and the other one of the first and second threaded portions coupled to the threaded bore of the pivot component for changing an effective distance between the bore of the movable jaw portion and the pivot component, to thus effectively change a clamping force able to be applied by the movable jaw portion relative to the fixed jaw portion when the actuating lever is moved from an open position to a closed position.

14. The system of claim 13, wherein each said end support further includes a removable rear cover, and wherein a portion of the threaded member is accessible when the rear cover is removed.

15. The system of claim 14, wherein the threaded component includes a central portion shaped to receive an external wrench, to permit rotational movement and adjustment of the threaded member when the rear cover is removed.

16. The system of claim 13, wherein the end support includes at least one ball plunger assembly for holding the actuating in an open position.

17. The system of claim 16, wherein the at least one ball plunger assembly is mounted to the actuating lever, and wherein the end support main housing includes a structural component for engaging with a movable ball of the at least one ball plunger when the actuating lever is moved into the open position.

18. The system of claim 13, wherein each of the end supports includes a fixed pad assembly secured to the fixed jaw portion, the fixed pad assembly including:
an elastomeric portion having a projecting boss portion, the projecting boss portion having an enlarged, compressible head portion; and
the compressible head portion configured to engage with a hole in the end support main portion to secure the fixed pad assembly to the fixed jaw portion of the at least one end support.

19. The system of claim 10, wherein the compressible head portion forms a stop for the actuating lever when the actuating lever is moved into the closed position.

20. A vehicle article carrier system for supporting articles above an outer body surface of a vehicle, the system comprising:
a pair of support rails capable of being fixedly secured generally parallel to one another on the outer body surface;
at least one cross bar assembly releasably clampable to the support rails, the cross bar assembly including:
a cross bar element having opposing ends;
first and second end supports secured at the opposing ends, the end supports being able to engage with the support rails to secure the cross bar against movement on the support rails;
each of the end supports including:
an end support main housing;
a fixed jaw portion integrally formed with the end support main housing;
a movable jaw portion having a bore;
an actuating lever pivotally mounted to the end support main housing;
a pivot component pivotally coupled to the actuating lever and movable pivotally when the actuating lever is moved between open and closed positions, the pivot component including a threaded bore;
a barrel nut positioned in the bore of the movable jaw portion, the barrel nut including a threaded bore;
a threaded member having a first threaded portion and a second threaded portion, wherein one of the first and second threaded portions forms a right handed thread and the other one of the first and second threaded portions forms a left hand handed thread;
one of the first and second threaded portions coupled to the threaded bore of the barrel nut and the other one of the first and second threaded portions coupled to the threaded bore of the pivot component for changing an effective distance between the bore of the movable jaw portion and the pivot component, to thus effectively change a clamping force able to be applied by the movable jaw portion relative to the fixed jaw portion when the actuating lever is moved from an open position to a closed position; and
at least one ball plunger assembly for holding the actuating lever in the open position once the actuating lever is rotated into the open position.

* * * * *